United States Patent
Schiele

(10) Patent No.: US 6,785,598 B2
(45) Date of Patent: Aug. 31, 2004

(54) CONTROL SYSTEM FOR A MOTOR VEHICLE TRANSMISSION COMPRISING A TORQUE CONVERTER OR A HYDRODYNAMIC CLUTCH

(75) Inventor: Peter Schiele, Kressbronn (DE)

(73) Assignee: ZF Friedrichshafen, Friedrichshafen (DE)

( * ) Notice: Subject to any disclaimer, the term of this patent is extended or adjusted under 35 U.S.C. 154(b) by 0 days.

(21) Appl. No.: 10/275,609
(22) PCT Filed: May 8, 2001
(86) PCT No.: PCT/EP01/05205
§ 371 (c)(1), (2), (4) Date: Nov. 7, 2002
(87) PCT Pub. No.: WO01/86176
PCT Pub. Date: Nov. 15, 2001

(65) Prior Publication Data
US 2003/0130088 A1 Jul. 10, 2003

(51) Int. Cl.⁷ .................. B60K 41/08; F16H 45/02; F16H 59/14
(52) U.S. Cl. ................ 701/51; 701/67; 477/159
(58) Field of Search .............. 701/51, 67, 68; 477/154, 159, 158, 169, 174, 175, 61, 11, 63, 181, 77, 121; 192/87.17, 103 F, 109 F; 475/69, 129

(56) References Cited

U.S. PATENT DOCUMENTS

| | | | | |
|---|---|---|---|---|
| 3,633,364 A | * | 1/1972 | Haide et al. ................. 60/362 |
| 3,757,606 A | * | 9/1973 | Forster et al. ................ 475/69 |
| 4,730,708 A | | 3/1988 | Hamano et al. .......... 192/0.033 |
| 4,775,938 A | | 10/1988 | Hiramatsu ............... 364/424.1 |
| 5,272,630 A | | 12/1993 | Brown et al. ............ 364/424.1 |
| 5,637,052 A | * | 6/1997 | Hirota et al. ................. 477/61 |
| 6,132,335 A | * | 10/2000 | Fischer ....................... 477/169 |
| 6,154,701 A | | 11/2000 | Löffler et al. ................. 701/54 |
| 6,176,812 B1 | * | 1/2001 | Taki et al. ................... 477/159 |
| 6,216,075 B1 | | 4/2001 | Speicher et al. ............. 701/51 |

FOREIGN PATENT DOCUMENTS

| | | | | |
|---|---|---|---|---|
| DE | 42 35 827 A1 | 4/1994 | .......... B60K/26/00 |
| DE | 196 31 070 A1 | 2/1998 | .......... F16H/59/06 |
| DE | 197 03 863 A1 | 8/1998 | .......... B60K/41/04 |
| DE | 198 40 573 A1 | 3/2000 | .......... F16D/48/06 |
| EP | 0 733 508 A2 | 9/1996 | .......... B60K/41/02 |
| EP | 0 760 442 A1 | 3/1997 | .......... F16H/61/04 |
| WO | 98/33673 | 8/1998 | .......... B60K/41/14 |

\* cited by examiner

*Primary Examiner*—Tan Q. Nguyen
*Assistant Examiner*—Dalena Tran
(74) *Attorney, Agent, or Firm*—Davis & Bujold, P.L.L.C.

(57) ABSTRACT

A control system for a transmission comprising a torque converter or a hydrodynamic clutch in a motor vehicle, at least one torque-conducting clutch or brake in the starting operation of the motor vehicle. It is proposed to regulate the starting power of the motor vehicle as function of a driver's wish, via a slip clutch or brake mounted in the transmission, taking into account parameters of the torque converter and/or hydrodynamic clutch.

16 Claims, No Drawings

CONTROL SYSTEM FOR A MOTOR VEHICLE TRANSMISSION COMPRISING A TORQUE CONVERTER OR A HYDRODYNAMIC CLUTCH

FIELD OF THE INVENTION

The invention relates to a control system for a transmission comprising a torque converter or a hydrodynamic clutch in a motor vehicle for control or regulation of a starting operation of the motor vehicle.

BACKGROUND OF THE INVENTION

Engines with exhaust gas turbo-charge are often used in modem motor vehicles having diesel prime movers. From ecological viewpoints an almost smoke-free operation of the diesel engine is sought in the whole range of operation. For the purpose can be injected only as much fuel as can be burnt without soot with the air mass delivered via the exhaust gas turbo-charger. When the engine is idling, the air mass delivered is accordingly small. The starting behavior of a motor vehicle thus motorized can be felt by the driver as unsatisfactory, especially in case of a quick and high power demand. The rise in rotational speed of the exhaust gas turbine and the increase associated therewith of the air mass charge directly limit the amount of fuel in the starting operation that can be injected for increasing the power in preventing a "sooting". Only with the rising rotational speed of the engine does the air mass charge increase and therewith the injection amount of fuel and consequently the engine torque. The torque increase at the beginning of the starting operation is accordingly low followed by a sharply progressive build up of the torque.

A similar problem results when using an otto engine turbo-charged with exhaust gas. The ecological critical value are here the exhaust gas composition in the idling operation and when greasing the fuel-air mixture during the starting operation. The air mass supplied to the engine by the turbo charge depends directly on the rotational speed of the exhaust gas turbine. The rotational speed acceleration of the exhaust gas turbine always occurs with a certain time offset relative to the power demand (accelerator pedal movement) of the driver more or less according to the size of the exhaust gas turbine. The driver feels this as an undesirably slow build up of the output torque of the vehicle usually designated as "turbo-lag".

In relation to converter automatic transmissions, the starting weakness of a motor vehicle turbo-charged with exhaust gas can be positively affected via the characteristic of the torque converter (trilok converter). In the converter is usually provided a lock-up clutch by which the hydraulic power transmission can be mechanically bridged for reducing slip losses in the operation of the vehicle at high velocities. The hydrodynamic torque transmission produces a jerk-free starting operation with corresponding increased comfort. But it is disadvantageous for the starting dynamics that the engine rotational speed must accelerate in direction of the absorption torque of the torque converter. To this are also added as losses training torques of the drive train that necessarily exist. Since the absorption torque of a converter with strong torque reinforcement ("weak" converter characteristic) is smaller than the one in a converter with low torque reinforcement ("strong" converter characteristic), the weakness described can be compensated, of course, at the cost of a "rubber-band like" guiding behavior of the engine rotational speed due to the weak characteristic. The converter absorption torque generally increases sharply, especially in the cold, whereby the starting weakness is further worsened.

If a hydrodynamic clutch is used instead of a trilok converter, a similar problem arises. Due to the lack of stator opposite to the torque converter, the torque of the engine cannot be reinforced whereby another disadvantage results in the uninterrupted build up of the output torque of the motor vehicle. A hydrodynamic clutch also is often combined with a lock-up clutch in order to eliminate slip losses at high velocities of the vehicle.

U.S. Pat. No. 4,775,938 has disclosed a method for the control of a starting operation of a vehicle having a converter automatic transmission in which, during the starting operation of the vehicle the differential rotational speed of a starting clutch rear-mounted on the torque converter is regulated taking into account an accelerator pedal position of the engine as load standard in the calculation of the clutch pressure.

From U.S. Pat. No. 5,272,630 has become known a method of the control of a starting operation of a vehicle having a converter automatic transmission from a stationary uncoupling function, that is, of a starting operation with previously opened starting clutch. The converter slip is adjusted to a nominal differential rotational speed via the starting clutch to be re-engaged. A load standard of the driver acts as interference variable in the proposed control circuit.

Neither of the two methods results in any satisfactory performance in relation to the above described problem of the starting weakness of a driving train with diesel engine loaded with exhaust gas, since the acceleration behavior of the rotational speed and the actual power development of the prime mover remain without being taken into account (disregarded) in the clutch regulation and the closing operation of the starting dutch therefore acts as interference variable upon the rotational speed acceleration of the prime mover.

The invention is based on the problem of providing a control system which is improved the starting behavior of a transmission having a torque converter or a hydrodynamic clutch, the same as a torque-conducting and regulatable clutch or brake mounted in the transmission.

This problem is solved with a control system having the features stated in the main claim.

SUMMARY OF THE INVENTION

According to the invention, it is, therefore, proposed that the starting operation of the motor vehicle be regulated, as function of a driver's wish, via a torque-conducting slip clutch or brake mounted in the transmission taking into account parameters of the torque converter or of the hydrodynamic clutch.

Via the slip in the torque-conducting clutch or brake, the rotational speed acceleration of the driving engine can be advantageously and purposefully controlled or adjusted. A turbo-lag described above, for example, is in this manner effectively prevented in the starting power of a vehicle with internal combustion engine loaded with exhaust gas.

The hydraulic absorption torque of the torque converter or of the hydraulic clutch to be applied by the engine becomes reduced to the extent to which the torque-conducting clutch or brake is opened, that is, brought to slip.

In the extreme case, the torque-conducting clutch or brake is briefly opened completely or almost completely up to the contact point, the piston, clutch or brake is in contact but transmission of torque has not occurred, that upon a power demand by the driver (accelerator pedal actuation) the engine can rotate at high speed almost free. Therefore, in the extreme case the engine acceleration is prevented in power flow direction until the open clutch or brake with the corresponding friction loss portions of the transmission, only by the rotatory inertia and the friction losses of the engine, the same as by the rotatory inertia of the rotary parts of the transmission, the loss portion of the converter absorption torque is completely eliminated.

Prior to and at the beginning of the starting operation the pressure in the torque-conducting clutch or brake is advantageously reduced to a value scarcely above the filling pressure of the clutch or brake, the piston of the clutch or brake thus remains at the contact point of the friction elements and a weak torque is transmitted. In this manner, the closing operation of the clutch or brake can be regulated shock-free and comfortably without dead times for the driver determined by the filling technology.

It has been found in tests that a small time offset between the power demand of the driver and the loose rolling of the vehicle, that is, the increase of the output rotational speed of the transmission, is not felt as negative, especially on account of the acoustic perception of the increasing rotational speed of the engine directly upon the accelerator pedal actuation. The slip regulation of the clutch or brake is conveniently carried out so that an optimum in starting power specific of the vehicle and mainly of the engine results.

A "rigid" or also "hard" characteristic of the torque converter or of the hydrodynamic clutch favorable to the dynamic operation can advantageously be provided with correspondingly direct guiding behavior of the engine rotational speed upon changes of the accelerator pedal by the driver in the prevalent operation in which a lock-up clutch of the converter is opened.

In a first inventive solution of the problem, it is proposed to regulate in the starting operation of the motor vehicle, as function of a driver's wish, an output torque $M\_Ab$ of the transmission, especially a timed output torque curve $M\_Ab(t)$, via a torque conducting clutch or brake mounted in the transmission. Instead of the transmission output torque, a vehicle output torque obviously can also be used. An accelerator pedal movement of the driver is here advantageously interpreted directly as torque demand on the transmission output. The output torque $M\_Ab$ or the timed curve thereof $M\_Ab(t)$ is here primarily dependent on the curve of the clutch torque In the slip phase. At the moment of the slipping transmission clutch or transmission brake, the starting power of the motor vehicle is thus uncoupled from the actual torque build up of the prime mover, also from a torque reduction or also torque increase demanded in the course of the closing process of the clutch or brake by the transmission control during the engine control.

In one development of the invention it is proposed to regulate in the starting operation of the motor vehicle, as function of a driver's wish, an output torque $M\_Ab$ of the transmission, especially a timed output torque curve $M\_Ab(t)$, via a torque conducting clutch or brake mounted in the transmission. Instead of the transmission output torque, a vehicle output torque obviously can also be used. An accelerator pedal movement of the driver is here advantageously interpreted directly as torque demand on the transmission output. The output torque $M\_Ab$ or the timed curve thereof $M\_Ab(t)$ is here primarily dependent on the curve of the clutch torque in the slip phase. At the moment of the slipping transmission clutch or transmission brake, the starting power of the motor vehicle is thus uncoupled from the actual torque build up of the prime mover, also from a torque reduction or also torque increase demanded in the course of the closing process of the clutch or brake by the transmission control during the engine control.

The regulation of the output torque $M\_Ab$ can thus be easuly attoned to a maximum possible starting power of the vehicle according to the actual power wish of the driver, for example, with linear torque build up on the transmission output.

A torque converter and a hydrodynamic clutch have a turbine which is torque-conductingly connected with the transmission input shaft. In a second inventive solution of the problem is proposed to regulate in the starting operation of the motor vehicle, as function of a driver's wish, a torque $M\_T$ of said turbine, especially a timed turbine torque curve $M\_T(t)$, via a torque-conducting clutch or brake mounted in the transmission. Advantageously is hereby a power demand of the driver, on one hand, directly converted by control technology as torque standard, on the other hand—in relation with type-dependent, structurally known parameters of the torque converter or of the hydrodynamic clutch—the engine rotational speed behavior subjectively important for the driver is also included in the regulation.

In another development of the invention is proposed to regulate in the starting operation of the vehicle, as function of a driver's wish, a rotational speed $n\_T$ of the turbine of the torque converter or of the hydrodynamic clutch, especially a timed turbine rotational speed curve $n\_T(t)$, via a torque-conducting clutch or brake mounted in the transmission. Hereby it is advantageously possible, especially in relation to type-dependent, structurally known parameters of the torque converter or of the hydrodynamic clutch, easily to guide the engine rotational speed $n\_Mot$ so that there always result for the driver during the starting operation a clearly understandable correlation between his pedal movement and the consequent behavior of the engine.

In a development for regulating the turbine rotational speed $n\_T$, it can be provided to use as regulation variable the gradient $dn\_T/dt$ thereof. The advantage attained hereby in the regulation dynamics, by preventing perceptible over oscillations of the of the engine rotational speed as consequence of a too belated reaction on the pressure side in the torque-conducting clutch or brake, especially in case of a quick and high power demand, acts positively both in starting comfort and in the safety relative to dutch damages.

In a further development of the regulation of the turbine rotational speed $n\_T$, of the timed curve $n\_T(t)$ of the turbine rotational speed, or of the turbine rotational speed gradient $dn\_T/dt$, it can be provided that the respective regulation variables $n\_T$, $n\_T(t)$ and $dn\_T/dt$ be function of the distance to the synchronization point of the closing operation of the torque-conducting clutch or brake. Hereby can be further improved the closing comfort of the clutch or brake, especially in the range of low slip rotational speeds.

Torque converter and hydrodynamic clutch have, together with the turbine, a pump which is connected with the driving engine in torque-conducting manner. The power is hydrodynamically transmitted from the pump to the turbine. In another development of the invention is proposed, in the starting operation of the motor vehicle, to regulate, as function of a driver's wish, a rotational speed ratio nue, which is defined as quotient of turbine rotational speed $n\_T$ and pump rotational speed $n\_P$ of the torque converter or of the hydrodynamic clutch, via a torque-conducting clutch or brake mounted in the transmission, especially taking into account the converter type used (torque converter or hydrodynamic clutch) and/or a temperature.

As parameters of the converter type are specially to be regarded the known structural rating values maximum converter reinforcement mue_max, converter pump torque M_P2000 (at an input rotational speed of 2000 1/min), but also the known converter diagrams with the functions pump torque MT_T=f(pump rotational speed n_P), torque behavior mue=f(rotational speed ratio nue) with mue=turbine torque M_T/pump torque M_P and nue=n_T/n_P, converter efficiency degree=f(rotational speed ratio nue), turbine torque M_T=f(turbine rotational speed n_T), pump rotational speed n_P=f(turbine rotational speed n_T), converter efficiency degree=f(turbine rotational speed n_T).

As temperature to be taken into account in the regulation, the transmission oil temperature is particularly to be provided, since it affects to a substantial extent the efficiency degree of the hydrodynamic circuit in the torque converter or in the hydrodynamic clutch and therewith the absorption torque. As substitute variables for the transmission oil temperature can also be used an engine oil temperature, a cold water temperature, or also an outer air temperature. Instead of a sensed temperature can also be used an imaginary temperature calculated via a suitable temperature pattern.

It thus advantageously results from the point of view of control technology a simple relation to the type-dependent, structurally known parameters of the torque converter or of the hydrodynamic clutch. Specially by taking into account the transmission oil temperature (or a corresponding substitute temperature) it is definitely possible to improve the starting power of a vehicle with exhaust gas turbo-charged internal combustion engine at low temperatures when, for example, the slip time of the torque-conducting clutch or brake is extended toward low temperatures or when the time portion is increased toward low temperatures with large clutch slip immediately at the beginning of the starting operation.

In a third inventive solution of the problem is proposed to regulate in the starting operation of the vehicle, as function of a driver's wish, a rotational speed ratio mue defined as quotient of turbine torque M_T and pump torque M_P of the torque converter or of the hydrodynamic clutch via a torque-conducting clutch or brake mounted in the transmission, especially taking into account the converter type (torque converter or hydrodynamic clutch) and/or a temperature. In this development is advantageous, on one hand, the easy adjustability according to control technology to converter typical influences on the starting power of the motor vehicle, on the other hand, also the torque orientation of the regulation already described above. As parameters of the torque converter or of the hydrodynamic clutch can be preferably be used parameters described above in relation to the regulation of the rotational speed ratio nue. The temperature can preferably be determined—as also described already—from a transmission oil temperature and/or engine oil temperature and/or engine coolant temperature and/or air temperature and/or calculated imaginary temperature.

In other embodiments of the invention is proposed, in the starting operation to regulate, as function of a driver's wish, an acceleration a_Fzg or a velocity v_Fzg of the motor vehicle, particularly the timed curve a_Fzg(t) or v_Fzg(t) thereof, via a torque-conducting clutch or brake mounted in the transmission. Of special advantage is here the good correlation according to automatic regulation technology to subjective perception of the driver who always feels his demand performance as vehicle acceleration and velocity increment.

In other developments of the invention is proposed, in the starting operation to regulate, as function of a driver's wish, an acceleration a_Fzg or a velocity v_Fzg of the motor vehicle, particularly the timed curve a_Fzg(t) or v_Fzg(t) thereof, via a torque-conducting clutch or brake mounted in the transmission. Of special advantage is here the good correlation according to automatic regulation technology to subjective perception of the driver who always feels his demand performance as vehicle acceleration and velocity increment.

DETAILED DESCRIPTION OF THE INVENTION

The driver's wish as input variable of the inventive control system can be formed on the prime mover as it is known, for example, from an accelerator pedal movement, that is, an accelerator pedal path and/or an accelerator pedal velocity, or from a position or change of a power control device. As driver's wish can also be used a calculated value existing as output variable of an E-gas system or of the engine control device, for example an accelerator pedal value, an accelerator pedal velocity, a power demand, an engine torque standard, an air mass signal of the engine, or an amount of fuel injection. The driver's wish can obviously be also defined by several parallel signals, and other vehicle systems—for example, a vehicle braking system, a velocity regulation system, or a traffic guiding system—be be included in the generation.

It is now proposed according to the invention to incorporate the driver's wish of the turbine torque M_T or M_T(t), of the turbine rotational speed n_T or n_T(t), of the turbine rotational speed gradient dn_T/dt, of the rotational speed ratio nue, of the torque ratio mue, of the vehicle acceleration a_Fzg or a_Fzg(t) and of the vehicle velocity v_Fzg or v_Fzg(t). From the driver's wish, a nominal value is hereby formed for the regulation, especially a timed nominal value curve or a nominal gradient. A preferred nominal standard is a nominal value M_Ab_sol of output torques, especially a timed nominal value M_Ab_soll(t) of the output torques and/or a nominal gradient dM_Ab_soll/dt of the output torques or variables equivalent thereto.

In another development of the invention can be provided for the regulation from the driver's wish to form a nominal value n_Ab_soll of an output rotational speed and especially a timed nominal curve n_Ab_soll(t) and/or a nominal gradient dn_Ab_soll/dt of output rotational speed, or variables equivalent thereto.

In still another development of the invention can be provided for the regulation from the driver's wish to form an engine torque nominal value M_Mot_soll and, in particular, a timed engine torque nominal curve M_Mot_soll(t) and/or an engine torque nominal gradient dM_Mot_soll/dt. In a further development of this is proposed to form the nominal value M_Mot_soll, or nominal curve M_Mot_soll(t), or nominal gradient dM_Mot_soll/dt of the engine torque as function of an intake air temperature of the engine and/or an outer air temperature on the motor vehicle and/or an air density of the intake air or of the outer air.

In another development of the invention can be provided for the regulation from the driver's wish to form an engine rotational speed nominal value n_Mot_soll and especially a timed engine rotational speed curve n_Mot_soll(t) and/or an engine rotational speed gradient dn_Mot_soll/dt.

In other developments of the invention can be provided for the regulation from the driver's wish to form an acceleration nominal value a_Fzg_soll or a velocity nominal value v_Fzg_soll of the vehicle, especially the timed nominal curves a_Fzg_soll(t) or v_Fzg_soll/dt thereof.

In order further to improve the spontaneity of the starting operation, it is advantageous in the regulation of the starting power, of the output torque M_Ab or M_Ab(t), of the turbine torque M_T or M_T(t), of the turbine rotational speed n_T or n_T(t), of the turbine rotational speed gradient dn_T/dt, of the rotational speed ratio nue, of the rotational speed ratio mue, of the vehicle acceleration a_Fzg or a_Fzg(t) and of the vehicle velocity v_Fzg or v_Fzg(t) to use not only the engine torque M_Mot actually available from the prime mover during the slip phase of the torque-conducting clutch or brake but, in addition, the rotatory torque which supports itself by the retardation of rotating parts of the transmission on the output of the transmission. The inclusion of rotating energy parts of the engine in the regulation likewise acts positively upon the dynamics of the starting operation. This is briefly explained herebelow in the example of an output regulation.

The maximum output torque M_Ab_ges utilizable for the starting operation is formed as known per se from a dynamic engine torque M_Mot_dyn_Ab and a rotatory torque portion M_rot_dyn_Ab of the rotary transmission components including torque converter and hydrodynamic clutch each mathematically calculated on the transmission output taking into account the transmission ratio. The dynamic engine torque M_Mot_dyn_Ab results here from the internal motor conversion of the driver's power demand. The torque transmitted during the slip phase of the clutch or brake is primarily determined by the normal force upon the friction surfaces applied on the pressure side, by the friction value of the friction surfaces and by the friction radius.

It has proved advantageous here to calculate the dynamic engine torque M_Mot_dyn_Ab for the pressure calculation of the torque-conducting clutch or brake during the slip phase thereof from an indicated engine torque M_Mot_ind, especially with regard to the engine rotational speed n_Mot increasing during the starting operation and the energy needed for said engine acceleration with the corresponding influence upon the transmission input torque. The indicated engine torque M_Mot _ind is usually calculated by engine control on the basis of many influence variables of engine technology and made available to other control devices in the motor vehicle for their use. Combined with a torque converter, it obviously is possible to also take Into account the actual torque reinforcement mue and the turbine torque curve respectively M_T(t), M_T(n_T).

| Reference numerals | |
|---|---|
| a_Fzg | acceleration of the motor vehicle |
| a_Fzg(t) | timed curve of the acceleration |
| a_Fzg_soll | nominal value of the acceleration |
| a_Fzg_soll(t) | nominal value of the acceleration curve |
| v_Fzg | velocity of the motor vehicle |
| v_Fzg(t) | timed curve of the velocity |
| v_Fzg_soll | nominal value of the velocity |
| v_Fzg_soll(t) | timed nominal curve of the velocity |
| n_Mot | engine rotational speed |
| n_Mot(t) | timed curve of the engine rotational speed |
| dn_Mot/dt | gradient of the engine rotational speed |
| n_Mot_soll | nominal value of the engine rotational speed |
| n_Mot_soll(t) | timed nominal curve of the engine rotational speed |
| dn_Mot_soll/dt | nominal gradient of the engine rotational speed |
| M_Mot | engine torque |
| M_Mot(t) | timed curve of the engine torque |
| dM_Mot/dt | gradient of the engine torque |
| M_Mot_soll | nominal value of the engine torque |
| M_Mot_soll(t) | timed nominal curve of the engine torque |
| dM_Mot_soll/dt | nominal gradient of the engine torque |
| M_Mot_dyn_Ab | dynamic engine torque reduced to the output rotational speed |
| M_Mot_ind | indicated engine torque |
| M_rot_dyn_Ab | rotatory torque of the transmission reduced to the output rotational speed |
| n_P | pump rotational speed of the torque converter or of the hydrodynamic clutch |
| n_T | turbine rotational speed of the torque converter or of the hydrodynamic clutch |
| n_T(t) | timed curve of the turbine rotational speed |
| dn_T/dt | gradient of the turbine rotational speed |
| nue | rotational speed ratio of the torque converter or of the hydrodynamic clutch; nue = n_T/n_P |
| M_P | pump torque of the torque converter or of the hydrodynamic clutch |
| M_T | turbine torque of the torque converter or of the hydrodynamic clutch |
| M_T(t) | timed curve of the turbine torque of converter or hydrodynamic clutch |
| mue | converter reinforcement of the torque converter; mue = M_T/M_P |
| n_Ab | output rotational speed of the transmission |
| n_Ab(t) | timed curve of the output rotational speed |
| dn_Ab/dt | gradient of the output rotational speed of the transmission |
| n_Ab_soll | nominal value of the output rotational speed |
| n_Ab_soll(t) | timed nominal curve of the output rotational speed |
| dn_Ab_soll/dt | nominal gradient of the output rotational speed |
| M_Ab | output torque of the transmission |
| M_Ab(t) | timed curve of the output torque |
| dM_Ab/dt | gradient of the output torque of the transmission |
| M_Ab_soll | nominal value of the output torque |
| M_Ab_soll(t) | nominal curve of the output torque |
| dM_Ab_soll/dt | nominal gradient of the output torque |

What is claimed is:

1. A control system of a transmission for a motor vehicle having one of a torque converter and a hydrodynamic clutch, comprising:

at least one of a torque-conducting slip clutch and brake for use in a starting operation of the motor vehicle, the starting power of the motor vehicle being regulated as function of a driver's wish via the at least one of a torque-conducting slip clutch and brake mounted in the transmission and as a function of characteristics of the one of the torque converter and of the hydrodynamic clutch, wherein before a starting operation of the motor vehicle torque transmission of the at least one of a torque-conducting sliip clutch and brake is regulated as a function of characteristics of the one of the torque converter and of the hydrodynamic clutch to compensate for a hydraulic torque absorption of the one of a torque converter and a hydrodynamic clutch, and during the starting operation of the motor vehicle an output torque (M_Ab) of the motor vehicle is regulated, as function of the driver's wish, via one of the torque-conducting slip clutch and brake.

2. The control system according to claim 1 wherein during the starting operation of the motor vehicle a timed output torque curve (M_Ab_(t)) of the motor vehicle is regulated, as function of the driver's wish, via said one of the slip clutch and brake mounted in the transmission.

3. The control system according to claim 1, wherein during the starting operation of the motor vehicle an acceleration (a_Fzg) of the motor vehicle is regulated, as a function of the driver's wish, via one of the slip clutch and brake mounted in the transmission.

4. The control system according to claim 1 wherein during the starting operation of the motor vehicle the acceleration curve (a_Fzg) is timed (a_Fzg(t)).

5. The control system according to claim 1, wherein during the starting operation of the motor vehicle, in which one of the torque converter and hydrodynamic clutch and a torque converter, a torque (M_T) of a turbine of the torque converter is regulated, as a function of the driver's wish, via one of the slip clutch and brake.

6. The control system according to claim 5, wherein during the starting operation of the motor vehicle the torque curve (M_T) is timed (M_T(t)).

7. The control system according to claim 1, wherein one of the torque converter and hydrodynamic clutch is a torque converter, and during the starting operation of the motor vehicle a converter reinforcement (mue) of the torque converter is regulated, as a function of the driver's wish, via one of the slip clutch and brake, the torque reinforcement (mue) being a function of a ratio of a turbine torque (M_T) to a pump torque (M_P) of the torque converter, a converter type and of a temperature.

8. The control system according to claim 1 wherein during the starting operation of the motor vehicle a rotational speed ratio (nue) of one of the torque converter and the hydrodynamic clutch, which is a function of at least one of a ratio of a turbine rotational speed (n_T) to a pump rotational speed (n_P) of the torque converter, a converter type and a temperature, is regulated, as a function of the driver's wish, via one of the slip clutch and brake, wherein during the regulation of the rotational speed ratio (nue) one of an engine rotational speed nominal value (n_Mot_soll) and a timed engine rotational speed curve (n_Mot_soll(t)) is preset.

9. The control system according to claim 7 wherein, when the temperature is used, the temperature is determined from one of at least one oil temperature of the transmission, an oil temperature of the engine, a coolant temperature of the engine, an air temperature and from an imaginary temperature calculated via a pattern.

10. The control system according to claim 1 wherein for regulating one of the slip dutch and brake, an output torque nominal value (M_Ab_soll) of one of the transmission and a variable equivalent thereto is formed, including using one of a timed output torque nominal curve (M_Ab_soll(t)) and an output torque nominal gradient (dM_Ab_soll/dt).

11. The control system according to claim 1, wherein for regulating one of the slip clutch and brake, one of an output rotational speed nominal value (n_Ab_soil) of the transmission and a variable equivalent thereto is formed, including a timed output rotational speed nominal curve (n_Ab_soll(t)).

12. The control system according to claim 1, wherein for regulating one of the slip clutch and brake, an acceleration nominal value (a_Fzg_soll) of the motor vehicle is formed, including the timed curve (a_Fzg_soll(t)) thereof.

13. The control system according to claim 1, wherein for the regulating one of the slip clutch and brake from a driver's wish, an engine torque nominal value (M_Mot_soll) of the engine driving the transmission is formed, including at least one of a timed engine torque nominal curve (M_Mot_soll(t)) and an engine torque nominal gradient (dM_Mot_soll/dt).

14. The control system according to claim 1, wherein the at least one of the engine torque nominal curve (M_Mot_soll(t)), and the engine torque nominal gradient (dM_Mot_soll/dt) is a function of at last one of an intake air temperature of the engine and one of an air density of the intake air and of the ambient air.

15. The control system according to claim 1, wherein for regulating one of the slip clutch or brake, an engine rotational speed nominal value (n_Mot_soll) of an engine driving the transmission is formed, including at least one of a timed engine rotational speed nominal curve (n_Mot_soll(t)) and an engine rotational speed nominal gradient (dn_Mot_soll/dt).

16. A control system of a transmission for a motor vehicle, having one of torque converter and a:
   at least one of a torque-conducting clutch and brake for use in starting operation of the motor vehicle, the starting power of the motor vehicle being regulated, as function of a driver's wish,
   via one of a slip clutch and brake mounted in the transmission, including characteristics of of the torque converter and of the hydrodynamic clutch, wherein during the;
   output torque (M_Ab) of the motor vehicle is regulated, as function of driver's wish, via one of the slip clutch and brake, wherein one of the torque converter and hydrodynamic clutch has a pump and a turbine and wherein the characteristics of one of the torque converter and of the hydrodynamic clutch are one or more of the parameters including:
   a type of one of the torque;
   converter and the hydrodynamic clutch,
   maximum torque reinforcement (mue_max) of the torque converter,
   a pump torque (M_P2000) of the torque converter at an input rotational speed of 2000 1/min,
   a characteristic line (M_P=f(n_P)) of a pump torque (M_P) as a function of a pump rotational speed (n_P),
   a characteristic line (mue=f(nue)) of a torque ratio (mue) as function of a rotational speed ratio (nue), the torque ratio (mue) being defined as a quotient of turbine torque (M_T) and a pump torque (M_P) and the rotational speed ratio as a quotient of turbine rotational speed (n_T) and pump rotational speed (n_P),
   a characteristic line of an efficiency degree of the torque converter and of the hydrodynamic clutch as a function of a rotational speed ratio (nue),
   a characteristic line (M_T=f(n_T)) of a turbine torque (M_T) as a function of a turbine rotational speed (n_T), and
   a characteristic line (M_P=f(n_T)) of pump rotational speed (n_P) as a function of a turbine rotational speed (n_T), and
   a characteristic line of an efficiency degree of the torque converter or of the hydrodynamic clutch as a function and the turbine rotational speed (n_T).

* * * * *